(12) United States Patent
Lee et al.

(10) Patent No.: US 8,208,098 B2
(45) Date of Patent: Jun. 26, 2012

(54) ORGANIC LIGHT EMITTING DIODE DISPLAY AND DRIVING METHOD THEREOF

(75) Inventors: Hwideuk Lee, Namyul-ri (KR); Jaeseok Park, Daegu (KR); Dongseok Park, Kyungsan-si (KR)

(73) Assignee: LG Display Co. Ltd., Seoul (KR)

( * ) Notice: Subject to any disclaimer, the term of this patent is extended or adjusted under 35 U.S.C. 154(b) by 183 days.

(21) Appl. No.: 12/616,545

(22) Filed: Nov. 11, 2009

(65) Prior Publication Data

US 2011/0051055 A1    Mar. 3, 2011

(30) Foreign Application Priority Data

Sep. 2, 2009  (KR) ........................ 10-2009-0082686

(51) Int. Cl.
*G02F 1/1335*  (2006.01)
(52) U.S. Cl. ........................ 349/108; 349/144
(58) Field of Classification Search .................. 349/106, 349/108, 144
See application file for complete search history.

(56) References Cited

U.S. PATENT DOCUMENTS

| 6,404,466 | B1 | 6/2002 | Miyahara |
| 2007/0229748 | A1* | 10/2007 | Fujita ............................ 349/141 |
| 2008/0068543 | A1 | 3/2008 | Mitsui et al. |
| 2008/0198311 | A1* | 8/2008 | Rho ............................... 349/106 |
| 2008/0204636 | A1* | 8/2008 | Ge et al. ........................ 349/114 |
| 2009/0268132 | A1* | 10/2009 | Takama et al. ............... 349/106 |
| 2010/0182555 | A1* | 7/2010 | Kimura et al. ................ 349/126 |

FOREIGN PATENT DOCUMENTS

| DE | 19959674 A1 | 6/2000 |
| DE | 10013219 A1 | 10/2000 |
| DE | 102006029909 A1 | 6/2007 |

OTHER PUBLICATIONS

Office Action issued in corresponding German Patent Application No. 10 2009 044 481.5 issued May 5, 2010.

* cited by examiner

*Primary Examiner* — Eric Wong (74) *Attorney, Agent, or Firm* — Brinks Hofer Gilson & Lione

(57) ABSTRACT

A liquid crystal display device includes: a liquid crystal panel including red, green, and blue subpixels and a viewing angle control subpixel, wherein the viewing angle control subpixel includes a lower transparent electrode formed between a shielding electrode and an upper transparent electrode, the lower transparent electrode is formed on the first substrate and connected to the upper transparent electrode, the lower transparent electrode overlaps with the shielding electrode with a first insulation film interposed therebetween to form a storage capacitor.

16 Claims, 9 Drawing Sheets

ORGANIC LIGHT EMITTING DIODE DISPLAY AND DRIVING METHOD THEREOF

This application claims the benefit of Korea Patent Application No. 10-2009-0082686, filed on Sep. 2, 2009, the entire contents of which is incorporated herein by reference for all purposes as if fully set forth herein.

BACKGROUND

1. Field of the Invention

This disclosure relates to a liquid crystal display device and a manufacturing method thereof.

2. Discussion of the Related Art

The importance of a flat panel display (FPD) has been emphasized following the development of multimedia technologies. In response to this trend, various flat type displays such as a liquid crystal display, a plasma display panel, and an organic field emission display have been put to practical use. Among them, some display devices, e.g., liquid crystal display devices and organic field emission displays, have devices and wires formed in a thin film shape on a substrate by deposition, etching, and so on.

The driving principle of liquid crystal display devices utilizes optical anisotropy and polarization properties of liquid crystal. Liquid crystal has directionality in the alignment its molecules due to its slender and long structure. Hence, it is possible to control the orientation of the liquid crystal molecules by artificially applying an electric field to the liquid crystal. Accordingly, by arbitrarily controlling the arrangement direction of the liquid crystal molecules, the alignment of the liquid crystal molecules is changed, so that an incident light is refracted in the alignment direction of the liquid crystal molecules by optical anisotropy to thereby display image information.

A liquid crystal display device includes a color filter substrate having a common electrode formed thereon, an array substrate having pixel electrodes formed thereon, and liquid crystal filled between the two substrates. Among liquid crystal display devices, a vertical electric field emission display device which vertically applies an electric field between the common electrode and the pixel electrodes has high transmittance and high aperture ratio, but has poor viewing angle. Many methods were suggested to solve the above-mentioned problems, and one example thereof is a horizontal electric field emission display device. However, a horizontal electric field emission display device shows less change in birefringence depending on a viewing angle direction so that it can have an improved viewing angle characteristic compared to the vertical electric field emission display device.

Recently, a liquid crystal display device that implements a viewing angle control method has been suggested in order for a user to selectively drive a wide viewing angle mode and a narrow viewing angle mode when working on a document which is important for security reasons. However, a conventional liquid crystal display device has a thick insulating layer region formed thereon due to structural and manufacturing process reasons and a deviation in the critical dimension (CD) of a pixel functioning to control viewing angle becomes larger to thereby reduce the aperture ratio and restrict the narrow viewing angle characteristic, and thus an improvement thereof is required.

BRIEF SUMMARY

A liquid crystal display device including: a liquid crystal panel includes red, green, and blue subpixels and a viewing angle control subpixel, wherein the viewing angle control subpixel includes a lower transparent electrode formed between a shielding electrode and an upper transparent electrode, the lower transparent electrode being formed on the first substrate, and connected to the upper transparent electrode, the lower transparent electrode and the shielding electrode overlap with a first insulation film interposed therebetween to form a storage capacitor.

In another aspect, a manufacturing method of a liquid crystal display device, includes: defining areas for red, green, and blue subpixels and an area for a viewing angle control subpixel on a first substrate; forming gate lines; forming a shielding electrode in the area of the viewing angle control subpixel; forming a first insulation film on the gate lines; forming data lines crossing the gate lines; forming a lower transparent electrode on the first insulation film to overlap with the shielding electrode and forming a pixel electrode on the first insulation film formed in the areas for the red, green, and blue subpixels; forming a second insulation film on the lower transparent electrode and the pixel electrode; and forming a upper transparent electrode connected to the lower transparent electrode on the second insulation film in the area for the viewing angle control subpixel and forming a lower common electrode having a plurality of segments on the second insulation film in the areas for the red, green, and blue subpixels.

BRIEF DESCRIPTION OF THE DRAWINGS

The accompanying drawings, which are included to provide a further understanding of the invention and are incorporated on and constitute a part of this specification illustrate embodiments of the invention and together with the description serve to explain the principles of the invention.

DETAILED DESCRIPTION OF THE DRAWINGS AND THE PRESENTLY PREFERRED EMBODIMENTS

Reference will now be made in detail embodiments of the invention examples of which are illustrated in the accompanying drawings.

Hereinafter, an implementation of this invention will be described in detail with reference to the accompanying drawings.

Figure 1:
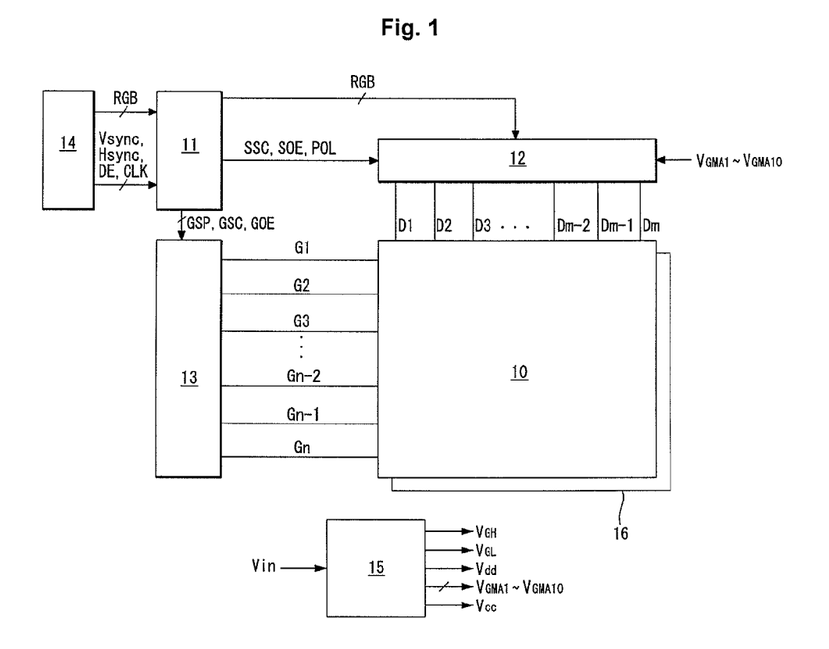
FIG. 1 is a block diagram for schematically explaining a liquid crystal display device.

Referring to FIG. 1, the liquid crystal display device includes a liquid crystal panel 10, a data driving circuit 12 connected to data lines D1~Dm of the liquid crystal panel 10, a gate driving circuit 13 connected to gate lines G1~Gn of the liquid crystal panel 10, a timing controller 11 for controlling the data driving circuit 12 and the gate driving circuit 13, and a power supply unit 15 for generating power.

The liquid crystal panel 10 includes a first substrate and a second substrate adhered together with a liquid crystal layer interposed therebetween. A pixel array of the first substrate includes thin film transistors formed at the crossing portions of the data lines D1~Dm and the gate lines G1~Gn and pixel electrodes connected to the thin film transistors. Each of the liquid crystal cells of the pixel array is driven by a voltage difference between a data voltage which is applied to the pixel electrode through the thin film transistors and a common voltage applied to a common electrode, and adjusts the amount of transmission of light incident from a backlight unit 16 to display an image of video data. A black matrix layer, a color filter layer, and the common electrode are formed on the second substrate. By the way, the common electrode may be respectively formed on each of the first and second substrates according to a driving method. A polarizer is formed on each of the first and second substrates of the liquid crystal panel 10, and an alignment film for setting a pre-tilt angle of liquid crystal is formed thereon.

A system board 14 transmits, along with RGB video data input from a broadcasting receiving circuit or an external video source, system signals, such as a vertical synchronization signal (Vsync), a horizontal synchronization signal (Hsync), a data enable signal (DE), and a dot clock (CLK), to the timing controller 11 through an LVDS (Low Voltage Differential Signaling) interface transmitting circuit or a TMDS (Transition Minimized Differential Signaling) interface transmitting circuit.

The power supply unit 15 adjusts a voltage Vin supplied to the system board 14 to generate a driving voltage, and supplies the generated driving voltage to at least one of the timing controller 11, the data driving circuit 12, the gate driving circuit 13, and the liquid crystal panel 10. The power supply unit 15 is formed as a DC-DC converter. The driving voltage generated by the power supply unit 15 includes a power supply voltage Vdd, a logic power supply voltage Vcc, a gate high voltage VGH, a gate low voltage VGL, a common voltage Vcom, and positive/negative gamma reference voltages VGMA1~VGMA10.

The timing controller 11 receives system signals, such as timing signals including a vertical synchronization signal Vsync, a horizontal synchronization signal Hsync, a data enable signal DE, and a dot clock CLK, through an LVDS (Low Voltage Differential Signaling) interface receiving circuit or a TMDS (Transition Minimized Differential Signaling) interface receiving circuit. The timing controller 11 generates driving signals, such as data control signals SSC, SOE, and POL to control the data driving circuit and gate signals, such as timing control signals GSP, GSC, and GOE to control the operation timing of the gate driving circuit 13 by using timing signals Vsync, Hsync, DE, and CLK.

The data driving circuit 12 samples and latches RGB digital video data RGB in accordance with RGB data of a mini LVD interface specification and a mini LVDS clock from the timing controller 11 and changes them into data of a parallel data format. In response to a polarity control signal POL, the data driving circuit 12 converts the digital video data, which are converted into a parallel data format, into positive/negative analog video data voltages for charging the liquid crystal cells by using positive/negative gamma reference voltage VGMA1~VGMA10.

The gate driving circuit 13 includes a shift register that sequentially shifts a gate driving voltage in response to gate timing signals GSP, GSC, and GOE from the timing controller 11 to sequentially supply gate pulses (or scan pulses) to the gate lines G1~Gn.

Figure 2:
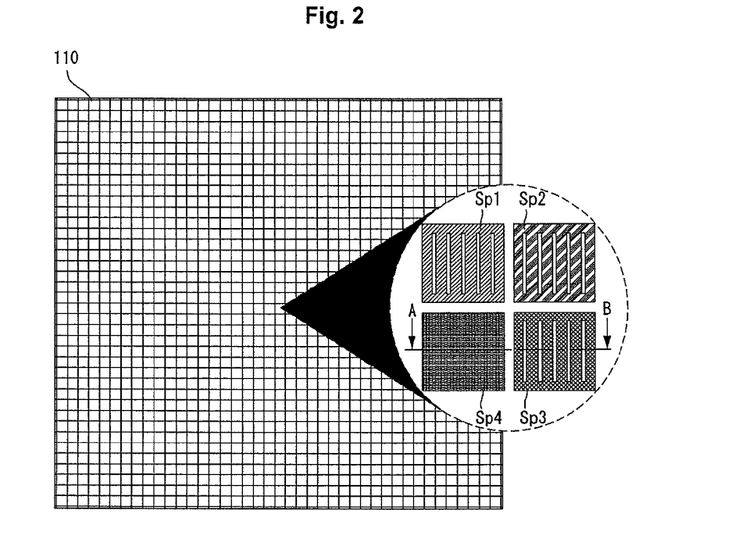
FIG. 2 is a plane view schematically showing a liquid crystal panel according to one exemplary embodiment of the present invention.

Referring to FIG. 2, the liquid crystal display device according to one exemplary embodiment of the present invention includes a liquid crystal panel 110 having red, green, and blue subpixels Sp1~Sp3 and a viewing angle control subpixel Sp4 which are arranged in a quad type to form one unit pixel. The red, green, and blue subpixels Sp1~Sp3 operate in an FFS (Fringe Field Switching) mode, and the viewing angle subpixel Sp4 operates in an ECB (Electrically Controlled Birefringence) mode. However, the red, green, and blue subpixels Sp1~Sp3 may be implemented so as to operate in an IPS (In-Plane Switching) mode. Although the shape of the subpixels Sp1~Sp3 is briefly illustrated in the drawings, the subpixels Sp1~Sp3 are disposed within the second substrate adhered to the first substrate and driven by the thin film transistors connected to the gate lines and the data lines.

Figure 3:
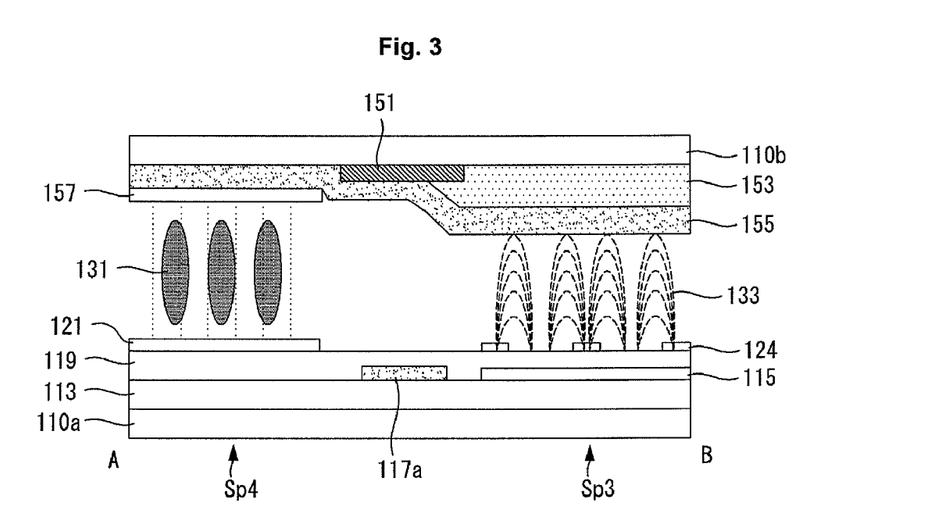
FIG. 3 is a cross sectional view explaining a driving mode of subpixels shown in FIG. 2.

Referring to FIG. 3, the viewing angle control subpixel Sp4 includes an upper transparent electrode 121 which is formed on first and second insulation films 113 and 119 formed on the first substrate 110a. Further, the viewing angle control subpixel Sp4 includes an upper common electrode 157 which is formed on an overcoating layer 155 formed on the second substrate 110b. The upper common electrode 157 may be formed along the black matrix layer 151. The upper common electrode 157 is formed on an outer circumference of the second substrate 110b and connected to a common voltage line formed on the first substrate 110a by a conductive ball or a silver dot when bonding the second substrate 110b and the first substrate 110a together. Here, the common voltage line may be divided into a common voltage line for supplying the same common voltage to the red, green, and blue subpixels Sp1, Sp2, and Sp3 and the viewing angle control subpixel Sp4 and a common voltage line for supplying a common voltage to the upper common electrode 157. Alternatively, one common voltage line may be used. For the viewing angle control subpixel Sp4, when a data voltage and a common voltage are supplied to the upper transparent electrode 121 and the upper common electrode 157, a potential difference is generated between them to thus raise a liquid crystal layer 131 in the illustrated electric field direction 133. At this point, light incident in a vertical direction of the first substrate 110a is not transmitted because there is no change in polarization. Thus, light incident to the viewing angle control subpixel Sp4 appears in black on the front surface of the liquid crystal panel. On the contrary, light incident in a diagonal direction of the first substrate 110a is polarized and transmitted by the liquid crystal layer 131. Therefore, the light incident to the viewing angle control subpixel Sp4 appears in white on a side surface of the liquid crystal panel.

On the other hand, the blue subpixel Sp3 includes a pixel electrode 115 formed between first and second insulation films 113 and 119 formed on the first substrate 110a and a lower common electrode 124 formed on the second insulation film 119 and divided into a plurality of segments. Further, the blue subpixel Sp3 includes a color filter layer 153 which covers the black matrix layer 151 formed on the second substrate 110b. For the blue subpixel Sp3, when a data voltage and a common voltage are supplied to the pixel electrode 115 and the lower common electrode 124, a potential difference is generated between them to thus allow a liquid crystal layer 131 to rotate in the illustrated electric field direction 133 by a fringe field effect. At this point, the light passed through the first substrate 110a is polarized and transmitted. Therefore, the light incident to the blue subpixel Sp3 appears in blue on the liquid crystal panel.

Hereinafter, the subpixels disposed on the liquid crystal panel will be described in more detail.

Figure 4:
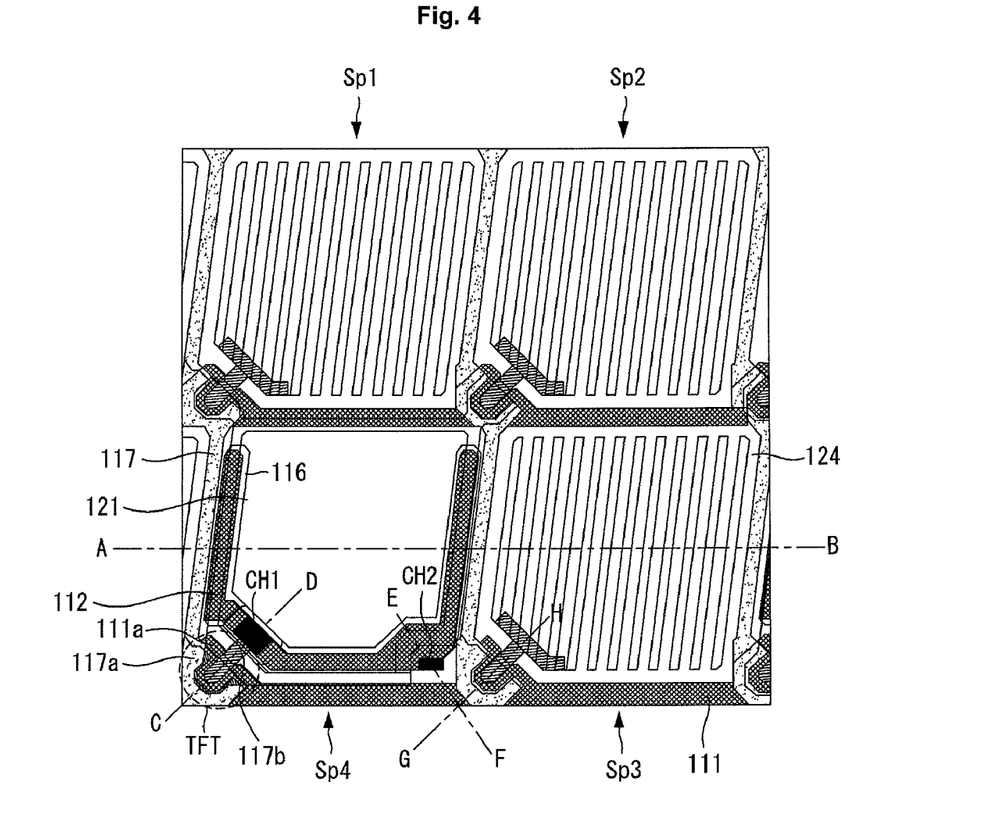
FIG. 4 is a plane view schematically showing a viewing angle control subpixel according to one exemplary embodiment of the present invention.

Referring to FIG. 4, there are illustrated the red subpixel Sp1, the green subpixel Sp2, the blue subpixel Sp3, and the viewing angle control subpixel Sp4. The illustrated subpixels Sp1, Sp2, Sp3, and Sp4 respectively include thin film transistors TFTs connected to the data lines 117 and the gate lines 111, respectively. The viewing angle control subpixel Sp4 includes a lower transparent electrode 116 overlapping with a shielding electrode 112 and an upper transparent electrode 121 connected to the lower transparent electrode 116 and the drain 117b of the thin film transistor TFT. The upper transparent electrode 121 is connected to the lower transparent electrode 116 and the drain 117b of the thin film transistor TFT through a first contact hole CH1, and is supplied with a data voltage through the drain 117b. The red, green, and blue subpixels Sp1, Sp2, and Sp3 are formed to share the lower common electrode 124 to which a common voltage is supplied. The lower common electrode 124 of the red, green, and blue subpixels Sp1, Sp2, and Sp3 is connected to the shielding electrode 112 of the viewing angle control subpixel Sp4 through a second contact hole CH2. Hereinafter, the structure of the subpixels Sp1, Sp2, Sp3, and Sp4 will be described with reference to the respective cross sectional views.

Figure 5:
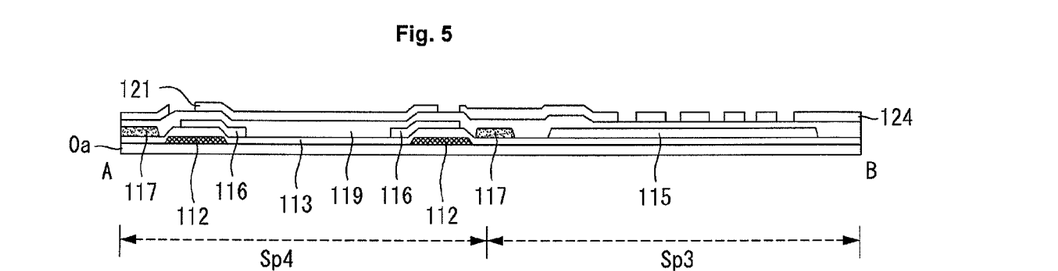
FIG. 5 is a cross sectional view of area A-B of FIG. 4.

Referring to FIGS. 4 and 5, there are illustrated the cross sectional views of the viewing angle control subpixel Sp4 and the blue subpixel Sp3. The shielding electrode 112 is formed in a spaced-apart and opposing fashion on the first substrate 110a defined as the area of the viewing angle control subpixel Sp4. Further, the gate line 111 including a gate electrode 111a is formed on the first substrate 110a defined as the area of the viewing angle control subpixel Sp4. The gate line 111 including a gate electrode 111a is formed on the first substrate 110a defined as the area of the blue subpixel Sp3. The shielding electrode 112 and gate line 111 of the viewing angle control subpixel Sp4 and the gate line 111 of the blue subpixel Sp3 are formed of the same material by the same process. The first insulation film 113 is formed on the area of the viewing angle control subpixel Sp4 so as to cover the shielding electrode 112 and the gate line 111, and the first insulation film 113 is formed on the area of the blue subpixel Sp3 so as to cover the gate line 111. The lower transparent electrode 116 is formed on the first insulation film 113 so as to overlap with the shielding electrode 112 formed in the area of the viewing angle control subpixel Sp4. The pixel electrode 115 formed on the area of the blue subpixel Sp3 is formed on the first insulation film 113. The lower transparent electrode 116 and the pixel electrode 115 are formed of the same material by the same process, and are patterned so as to be separated from each other. The data lines 117 defining the viewing angle control subpixel Sp4 and the blue subpixel Sp3, respectively, are formed on the first insulation film 113. The second insulation film 119 is formed on the areas of the viewing angle control subpixel Sp4 and the blue subpixel Sp3 so as to cover the lower transparent electrode 116, the pixel electrode 115, and the data lines 117. The upper transparent electrode 121 is formed on the second insulating film 119 in the area of the viewing angle control subpixel Sp4. The lower common electrode 124 divided into a plurality of segments is formed on the second insulation film 119 in the area of the blue subpixel Sp3.

Figure 6:
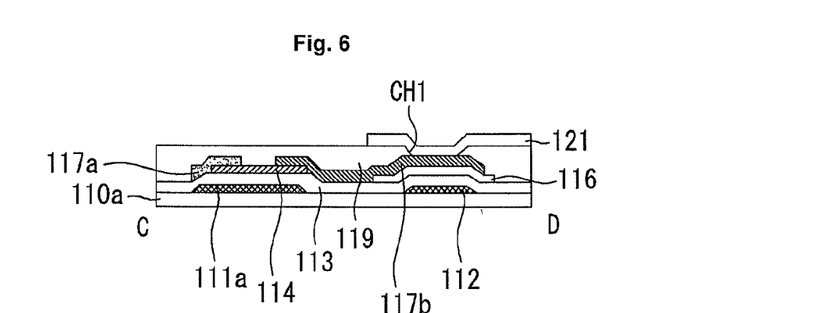
FIG. 6 is a cross sectional view of area C-D of FIG. 4.

Referring to FIGS. 4 and 6, there is illustrated the thin film transistor TFT of the viewing angle control subpixel Sp4. The gate electrode 111a connected to the gate line 111 supplied with a gate pulse is formed on the first substrate 110a. The shielding electrode 112 separated from the gate electrode 111a and supplied with a common voltage is formed on the first substrate 110a. The first insulation film 113 is formed on the gate electrode 111a and the shielding electrode 112. An active layer 114 is formed on the first insulation film 113, corresponding to the gate electrode 111a. The lower transparent electrode 116 is formed on the first insulation film 113, corresponding to the shielding electrode 112. A source electrode 117a connected to the data line 117 supplied with a data voltage is formed on one side of the active layer 114. The drain electrode 117b connected to the lower transparent electrode 116 is formed on the other side of the active layer 114. The second insulation film 119 is formed on the first insulation film 113 so as to cover the source electrode 117a and the drain electrode 117b. The first contact hole CH1 exposing part of the lower transparent electrode 116 is formed in the second insulation film 119. The upper transparent electrode 121 connected to the lower transparent electrode 116 through the first contact hole CH1 is formed on the second insulation film 119.

Figure 7:
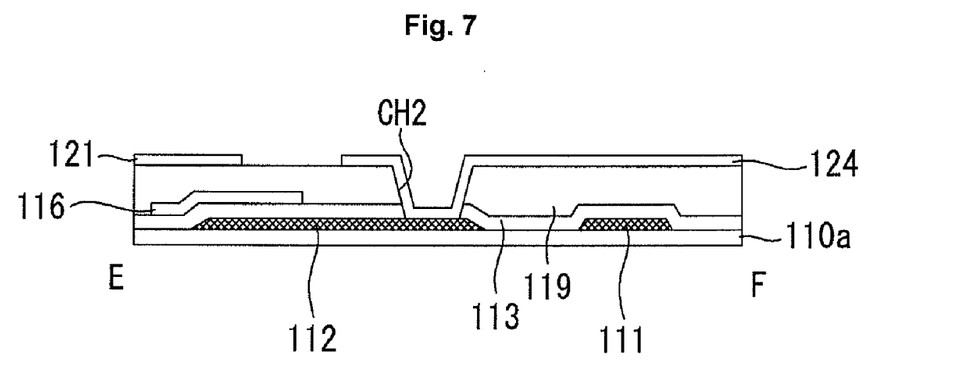
FIG. 7 is a cross sectional view of area E-F of FIG. 4.

Referring to FIGS. 4 and 7, there is illustrated the shielding electrode 112 and the lower common electrode 124 connected each other through the second contact hole CH2 on the viewing angle control subpixel Sp4. The shielding electrode 112 and the gate line 111 are formed on the first substrate 110a. The first insulation film 113 is formed on the first substrate 110a so as to cover the shielding electrode 112 and the gate line 111. The lower transparent electrode 116 is formed on the first insulation film 113 so as to overlap with the shielding electrode 112. The second insulation film 119 is formed on the first insulation film 113 so as to cover the lower transparent electrode 116. The second contact hole CH2 exposing part of the shielding electrode 112 is formed in the second insulation film 119. The lower common electrode 124 is formed on the second insulation film 119 so as to be connected to the shielding electrode 112 through the second contact hole CH2 and projected toward the neighboring blue subpixel Sp3. The upper transparent electrode 121 of the viewing angle control subpixel Sp4 is formed on the second insulation film 119 so as to be separated from the lower common electrode 124 of the blue subpixel Sp3. The lower common electrode 124 and the upper transparent electrode 121 are formed of the same material by the same process.

Figure 8:
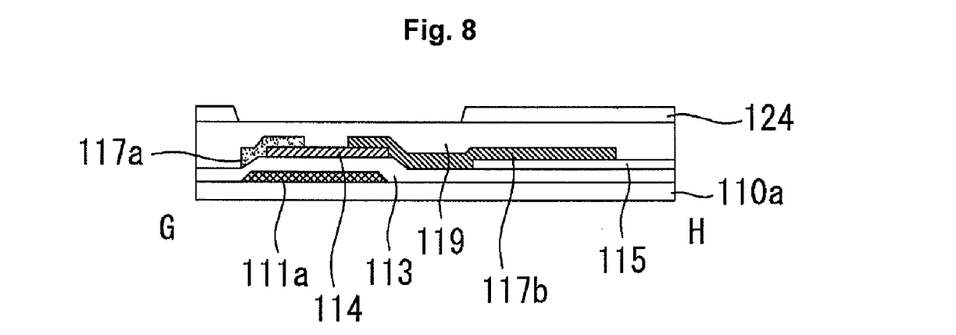
FIG. 8 is a cross sectional view of area G-H of FIG. 4.

Referring to FIGS. 4 and 8, there is illustrated the thin film transistor TFT of the blue subpixel Sp3. The gate electrode 111a connected to the gate line 111 supplied with a gate pulse is formed on the first substrate 110a. The first insulation film 113 is formed on the gate electrode 111a. The active layer 114 is formed on the first insulation film 113, corresponding to the gate electrode 111a. The pixel electrode 115 is formed on the first insulation film 113. The source electrode 117a connected to the data line 117 supplied with a data voltage is formed on one side of the active layer 114. The drain electrode 117b connected to the pixel electrode 115 is formed on the other side of the active layer 114. The second insulation film 119 is formed on the first insulation film 113 so as to cover the source electrode 117a and the drain electrode 117b. The lower common electrode 124 divided into a plurality of segments is formed on the second insulation film 119. When a potential difference is generated between the data voltage supplied to the pixel electrode 115 and the common voltage supplied to the lower common electrode 124, the blue subpixel Sp3 operates in the FFS mode in which the liquid crystal layer rotates in an electric field direction by the fringe field effect. Here, the subpixels operating in the FFS mode include the red and green subpixels Sp1 and Sp2 as well as the blue subpixel Sp3. While the exemplary embodiment has been described with respect to a case where the red, blue, and green pixels Sp1, Sp2, and Sp3 operate in the FFS mode, this exemplary embodiment may be implemented so that they operate in the IPS mode.

Hereinafter, the viewing angle control subpixel according to one exemplary embodiment of the present invention will be described.

Figure 9:
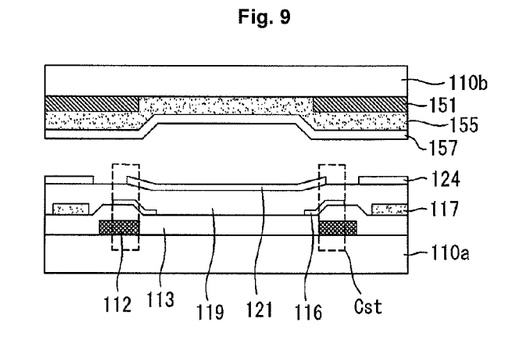
FIG. 9 is a cross sectional view of the viewing angle control subpixel.

Referring to FIG. 9, in the viewing angle control subpixel SP4 according to one exemplary embodiment of the present invention, the lower transparent electrode 116 connected to the upper transparent electrode 121 and the shielding electrode 112 form a storage capacitor Cst with the first insulation film 113 interposed therebetween. The structure of the viewing angle control subpixel Sp4 will be described in more detail below. However, illustration of the liquid crystal layer is omitted. The shield electrode 112 is formed on the first substrate 110a. A common voltage is supplied to the shield electrode 112. As shown in FIG. 4, the shielding electrode 112 is formed so as to occupy at least three sides within the area of the viewing angle control subpixel Sp4 and have two patterns spaced from each other and parallel to each other. The first insulation film 113 is formed on the shielding electrode 112. The lower transparent electrode 116 is formed on the first insulation film 113 to overlap with the shielding electrode 112. The data line 117 is formed on the first insulation film 113. Similarly to the shielding electrode 112, the lower transparent electrode 116 is formed so as to occupy at least three sides within the area of the viewing angle control subpixel Sp4 and have two patterns are spaced from each other and parallel to each other. The second insulation film 119 covering the lower transparent electrode 116 is formed on the first insulation film 113 so as to expose part of the lower transparent electrode 116. The upper transparent electrode 121 connected to the lower transparent electrode 116 through the first contact hole CH1 is formed on the second insulation film 119. The upper transparent electrode 121 is formed to partially overlap with the three sides of the shielding electrode 112 and of the lower transparent electrode 116 within the area of the viewing angle control subpixel Sp4. The black matrix layer 151 defining the areas of the subpixels is formed on the second substrate 110b. The black matrix layer 151 may include a photosensitive organic material to which black pigment is added, such as, but not limited to, carbon black or titanium oxide. The overcoating layer 155 covering the black matrix layer 151 is formed on the second substrate 110b. The overcoating layer 155 may include an organic material, an inorganic material, or a mixture thereof. The upper common electrode 157 is formed on the overcoating layer 155. The upper common electrode 157 is formed corresponding to the upper transparent electrode 121 within the area of the viewing angle control subpixel Sp4.

In the above-described exemplary embodiment, when a potential difference is generated between the data voltage supplied to the lower and upper transparent electrodes 116 and 121 and the common voltage supplied to the upper common electrode 157, the viewing angle control subpixel Sp4 operates in the ECB mode in which the liquid crystal layer is raised in an electric field direction. In the exemplary embodiment, when the narrow viewing angle mode is applied in the liquid crystal panel, the lower and upper transparent electrodes 116 and 121 are electrically connected in order to increase the aperture ratio of the viewing angle control subpixel Sp4, and, along with the shielding electrode 112, form a storage capacitor Cst. Therefore, the viewing angle control subpixel Sp4 of the exemplary embodiment can increase the aperture ratio while increasing the capacitance of the storage capacitor Cst.

Figure 10:
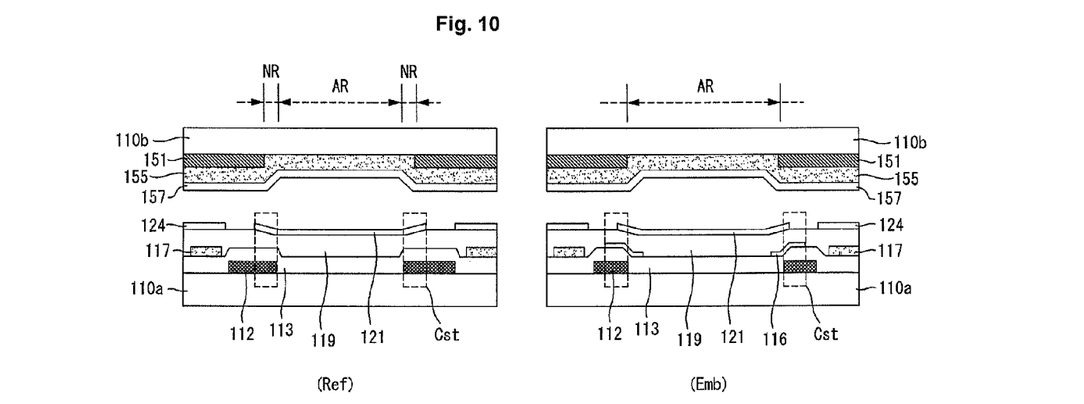
FIG. 10 is a view for explaining a difference between a comparative example and an exemplary embodiment.

Referring to FIG. 10, there are illustrated a comparative example Ref and an exemplary embodiment Emb. In the structure of the comparative example Ref, the shielding electrode 112 supplied with a common voltage and the upper transparent electrode 121 supplied with a data voltage form a storage capacitor Cst with the first and second insulation films 113 and 119 interposed therebetween. In the structure of the comparative example Ref, the area occupied by the shielding electrode 112 has to be increased in order to compensate for a decrease of the capacitance of the storage capacitor Cst due to the thickness of the insulation films 113 and 119 formed between the shielding electrode 112 and the upper transparent electrode 121. In this case, the non-aperture region NR is increased by an increase in the critical dimension of the shielding electrode 112 as well as by an increase in the area occupied by the shielding electrode 112. Therefore, in the structure of the comparative example Ref, the area of the aperture region AR becomes smaller due to the increase in the non-aperture region NR. As a result, the narrow viewing angle characteristic of the liquid crystal panel is restricted.

On the other hand, in the structure of the exemplary embodiment Emb, the lower transparent electrode 116 and upper transparent electrode 121 supplied with a data voltage are formed on the first insulation film 113 and the second insulation film 119, respectively, and they are electrically connected to thus form a storage capacitor Cst along with the shielding electrode 112. Therefore, in the structure of the exemplary embodiment Emb, the lower transparent electrode 116 and the shielding electrode 112 form the storage capacitor Cst with the first insulation film 113 interposed therebetween. In this case, the area occupied by the shielding electrode 112 can be decreased by 60% compared to the comparative example Ref while maintaining the capacitance of the storage capacitor Cst the same as in the structure of the comparative example Ref. Accordingly, in the structure of the exemplary embodiment Emb, the area of the aperture region AR can be increased compared to the comparative example Ref, thereby improving the narrow viewing angle characteristic of the liquid crystal panel. Although the exemplary embodiment has been described with respect to a case where the capacitance of the storage capacitor Cst is maintained the same as in the structure of the comparative example Ref, the area of the aperture area AR can be increased while increasing the capacitance of the storage capacitor Cst compared to the comparative example Ref.

Hereinafter, a manufacturing method of a liquid crystal display device will be described.

Figure 11:
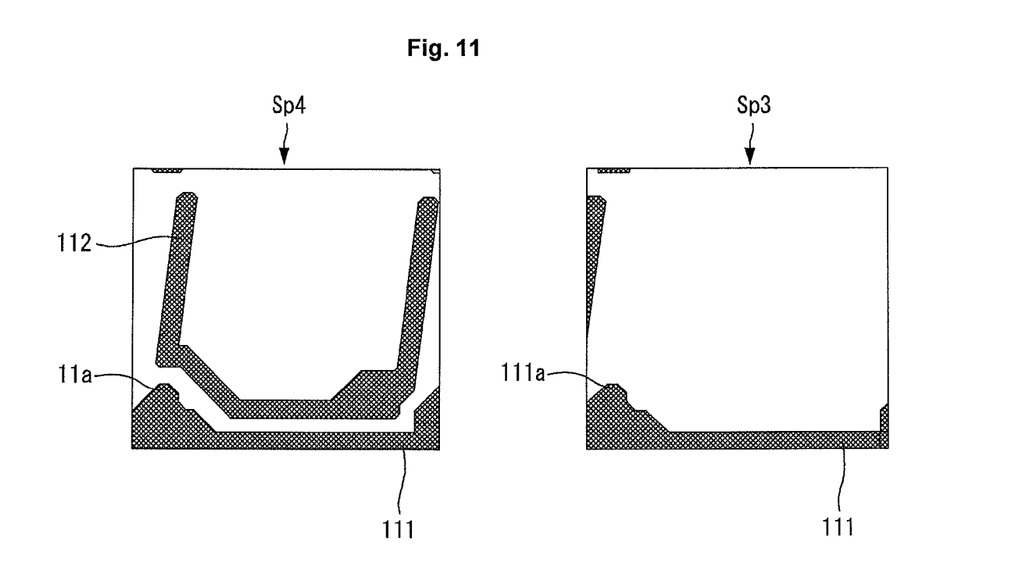
FIGS. 11 to 16 are plane views for explaining a manufacturing method according to one exemplary embodiment of the present invention.

As shown in FIGS. 5 and 11, the gate line 111 including the gate electrode 111a is formed in the area of the viewing angle control subpixel Sp4 and the area of the blue subpixel Sp3, respectively. On the first substrate 110a formed in the area of the viewing angle control subpixel Sp4, the shielding electrode 112 is formed which occupies at least three sides within the area of the viewing angle control subpixel Sp4 and has two patterns spaced from each other and parallel to each other. The gate lines 111 and the shielding electrode 112 may be formed of the same material by the same process, but are not limited thereto. The gate lines 111 and the shielding electrode 112 may be a single layer formed of any one selected from the group consisting of molybdenum (Mo), aluminum (Al), chromium (Cr), gold (Au), titanium (Ti), nickel (Ni), neodymium (Nd), and copper (Cu), or a multilayer formed of one or more of these materials, but are not limited thereto. Afterwards, the first insulation film 113 is formed in the area of the viewing angle control subpixel Sp4 so as to cover the gate line 111 and the shielding electrode 112, and the first insulation film 113 is formed in the area of the blue subpixel Sp3 so as to cover the gate line 111. The first insulation film 113 may be formed of a silicon oxide film (SiOx), a silicon nitride film (SiNx), or a multilayer thereof, but is not limited thereto.

Figure 12:
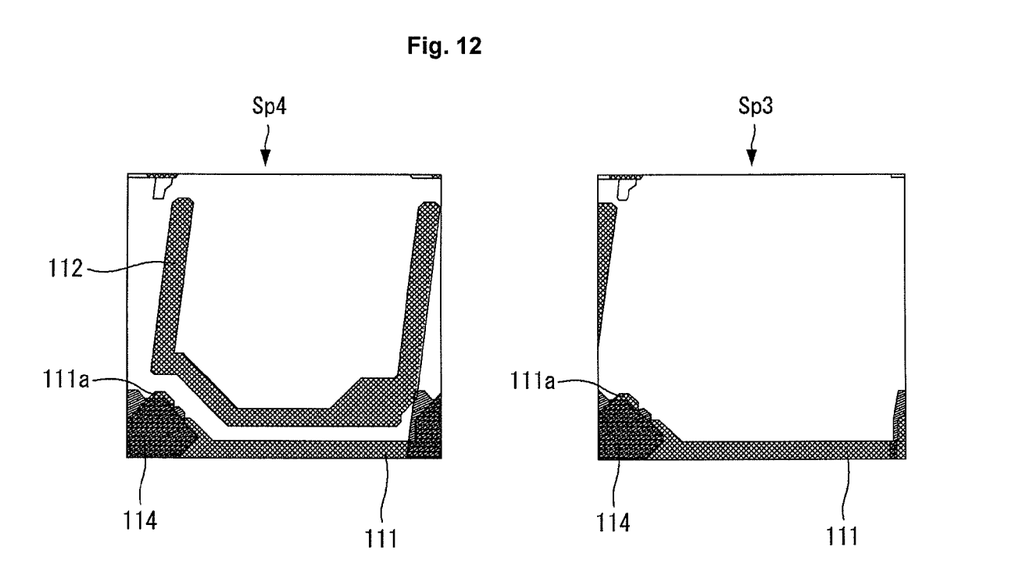

As shown in FIGS. 5 and 12, the active layer 114 is respectively formed on the gate lines 111 formed in the area of the viewing angle subpixel Sp4 and the area of the blue subpixel Sp3.

Figure 13:
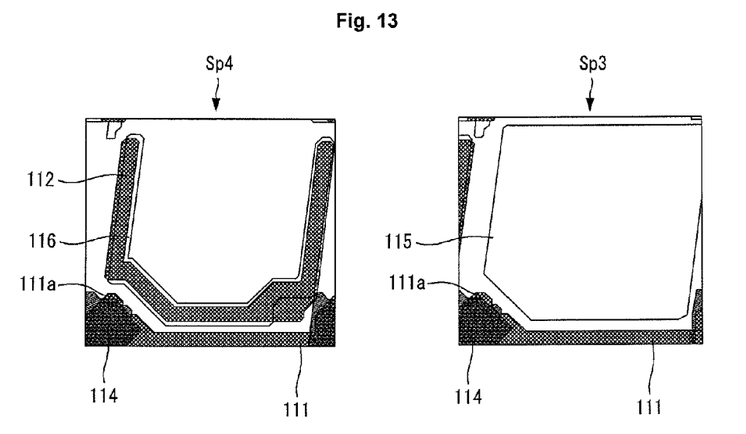

As shown in FIGS. 5 and 13, the lower transparent electrode 116 is formed in the area of the viewing angle control subpixel Sp4 so as to have a region overlapping with the shielding electrode 112 formed thereunder. The pixel electrode 115 is formed in the area of the blue subpixel Sp3. The pixel electrode 115 is formed so as to correspond to the aperture region. The lower transparent electrode 116 and the pixel electrode 115 may be formed of the same material by the same process, but are not limited thereto. The lower transparent electrode 116 and the pixel electrode 115 may be formed of ITO (Indium Tin Oxide), IZO (Indium Zinc Oxide), or ZnO (Zinc Oxide), but are not limited thereto.

Figure 14:
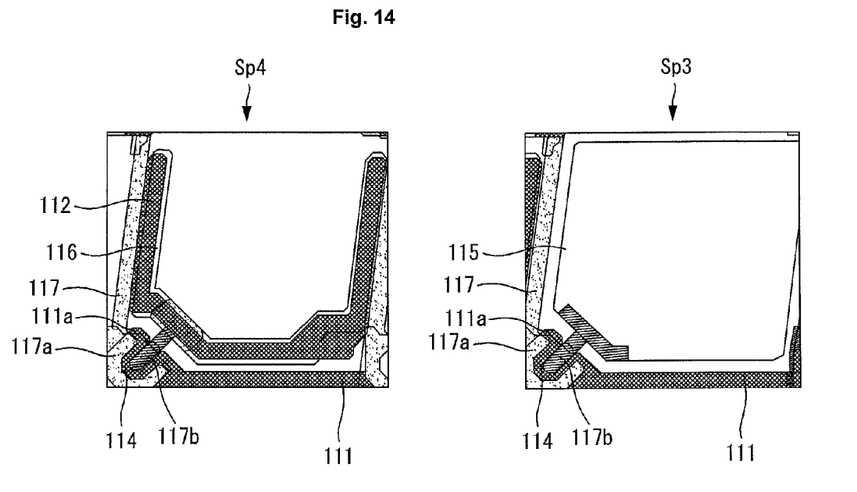

As shown in FIGS. 5 and 14, the source electrode 117a and the drain electrode 117b are formed on one side and the other side of the active layer 114 formed in the area of the viewing angle control subpixel Sp4 and the area of the blue subpixel Sp3. Here, the data lines 117 formed in the area of the viewing angle control subpixel Sp4 and the area of the blue subpixel Sp3 are formed by the same process as the source electrodes 117a. The drain electrode 117b formed in the area of the viewing angle control subpixel Sp4 is connected to the lower transparent electrode 116, and the drain electrode 117b formed in the area of the blue subpixel Sp3 is connected to the pixel electrode 115. The source electrodes 117a and the drain electrodes 117b may be a single layer formed of any one selected from the group consisting of molybdenum (Mo), aluminum (Al), chromium (Cr), gold (Au), titanium (Ti), nickel (Ni), neodymium (Nd), and copper (Cu), or a multi-layer formed of one or more of these materials, but are not limited thereto. Although the exemplary embodiment has been described with respect to a case where the source and drain electrodes 117a and 117b are formed after the formation of the lower transparent electrode 116, the lower transparent electrode 116 may be formed after the formation of the source and drain electrodes 117a and 117b.

Figure 15:
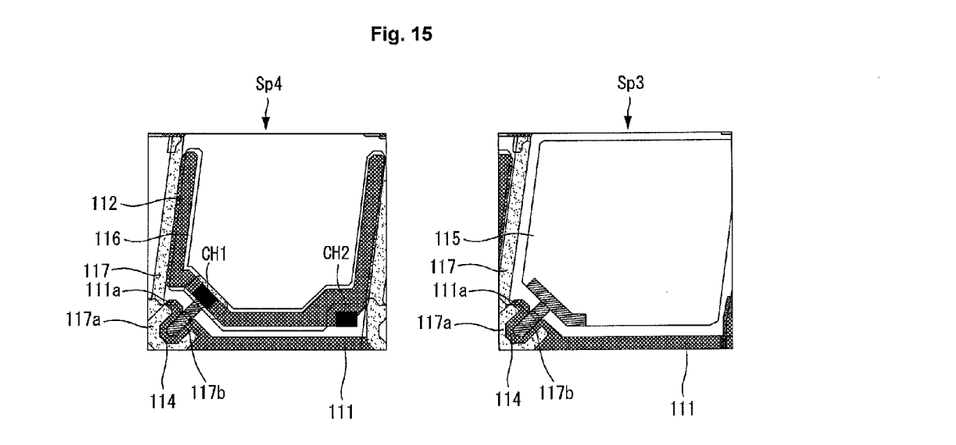

As shown in FIGS. 6, 7, and 15, the second insulation film 119 is formed so as to cover the source electrodes 117a and the drain electrodes 117b that are formed in the area of the viewing angle control subpixel Sp4 and the area of the blue subpixel Sp3. The first contact hole CH1 exposing part of the drain electrode 117b and the second contact hole CH2 exposing part of the shielding electrode 112 are formed in the second insulation film 119 formed in the area of the viewing angle control subpixel Sp4. The second insulation film 119 may be formed of a silicon oxide film (SiOx), a silicon nitride film (SiNx), or a multilayer thereof, but is not limited thereto.

Figure 16:
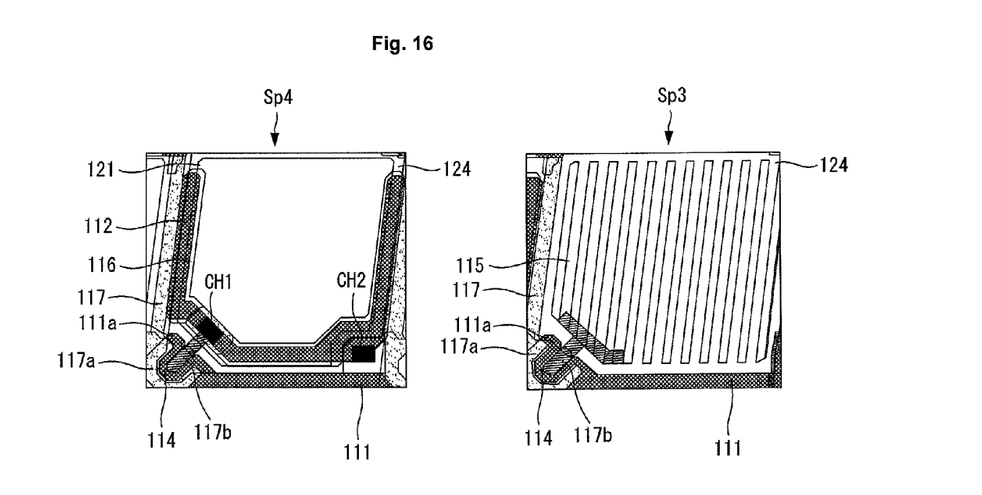

As shown in FIGS. 5 and 16, the upper transparent electrode 121 is formed on the second insulation film 119 formed in the area of the viewing angle control subpixel Sp4, and the upper transparent electrode 121 is formed so as to correspond to the aperture region. The upper transparent electrode 121 is formed so as to have a region overlapping with the lower transparent electrode 116 formed thereunder, and is connected to the lower transparent electrode 116 through the first contact hole CH1. The lower common electrode 124 is formed on the second insulation film 119 formed in the area of the blue subpixel Sp3. The lower common electrode 124 is divided into a plurality of segments within the aperture region, and is connected to the shielding electrode 112 of the viewing angle control subpixel Sp4 through the second contact hole CH2.

Figure 17:
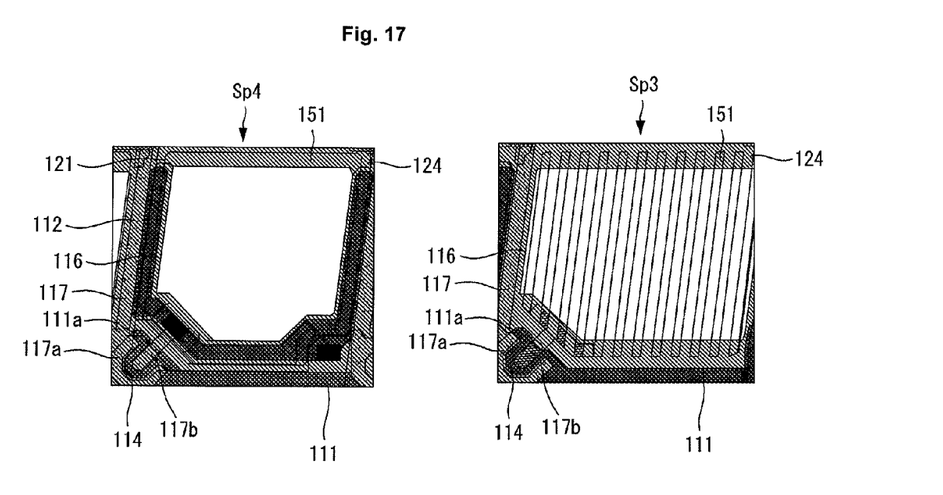
FIG. 17 is a view showing a black matrix layer on the plane view of FIG. 16.

Referring to FIG. 17, the viewing angle control subpixel Sp4 and the blue subpixel Sp3 manufactured by the process of FIG. 16 have the aperture regions as shown in the drawing by means of the black matrix layer 151.

With the configuration as described above, quad type sub-pixels including red and green subpixels, a color filter layer, etc. are formed respectively on two substrates. And, the two substrates are adhered together by using an adhesive member to thus complete the liquid crystal panel with the liquid crystal layer formed therebetween. While the exemplary embodiment of the present invention has been described with reference to a schematic view of one of the structures of the red, green, and blue subpixels in order to explain the structure of the electrodes forming a storage capacitor Cst in the structure of the viewing angle control subpixel Sp4, the present invention is not limited thereto.

As seen from above, the present invention can provide a liquid crystal display device which can improve viewing angle control efficiency by increasing the aperture ratio of the viewing angle control subpixel. Further, the present invention can provide a liquid crystal display device which can reduce character readability from the direction of a viewing angle along with the improvement of viewing angle control efficiency. Further, the present invention can provide a liquid crystal display device which can increase the capacitance of the storage capacitor.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures. Moreover, unless the term "means" is explicitly recited in a limitation of the claims, such as limitation is not intended to be interpreted under 35 USC 112 (6).

The invention claimed is:

1. A liquid crystal display device comprising: a liquid crystal panel including red, green, and blue subpixels and a viewing angle control subpixel which are disposed within a second substrate adhered to a first substrate and driven by transistors connected to gate lines and data lines,
    wherein the viewing angle control subpixel includes a lower transparent electrode formed between a shielding electrode and an upper transparent electrode, which are formed on one surface of the first substrate, and connected to the upper transparent electrode,
    the lower transparent electrode and the shielding electrode being positioned with a first insulation film interposed therebetween to form a storage capacitor
    wherein the red, green, and blue subpixels and the viewing angle, control subpixel are arranged in a quad type to form one unit pixel,
    wherein the red, green, and blue subpixels operate in an FFS (Fringe Field Switching) mode, and the viewing angle control subpixel operates in an ECB (Electrically Controlled Birefringence) mode,
    wherein the viewing angle control subpixel comprises:

the shielding electrode positioned on one surface of the first substrate, the first insulation film positioned on the shielding electrode, a lower transparent electrode positioned on the first insulation film so as to overlap with the shielding electrode, a second insulation film covering the lower transparent electrode on the first insulation film so as to expose part of the lower transparent electrode; and the upper transparent electrode positioned on the second insulation film so as to be connected to the lower transparent electrode.

2. The liquid crystal display device of claim 1, wherein one or more of the shielding electrode and the lower transparent electrode occupy at least three planes within the area of the viewing angle control subpixel and have two patterns spaced from each other and parallel to each other.

3. The liquid crystal display device of claim 2, wherein the upper transparent electrode is formed such that the three planes of the shielding electrode and of the lower transparent electrode overlap with some regions within the area of the viewing angle control subpixel.

4. The liquid crystal display device of claim 1, wherein the viewing angle control subpixel comprises:
 a black matrix layer positioned on one surface of the second substrate and defining the areas of the subpixels;
 an overcoating layer covering the black matrix layer; and
 an upper plate common electrode covering the overcoating layer.

5. The liquid crystal display device of claim 4, wherein the upper transparent electrode is formed corresponding to the upper transparent electrode within the viewing angle control subpixel.

6. The liquid crystal display device of claim 1, wherein the red, green, and blue subpixels comprise a color filter layer which is formed dividedly on one surface of the second substrate to define different luminescent colors for the subpixels.

7. The liquid crystal display device of claim 1, wherein the red, green, and blue subpixels each comprise:
 a pixel electrode positioned on the first insulation film; and
 a lower plate common electrode positioned on the second insulation film and divided into a plurality of segments.

8. The liquid crystal display device of claim 7, wherein the lower plate common electrode formed at a subpixel adjacent to the viewing angle control subpixel is connected to the shielding electrode of the viewing angle control subpixel, and the red, green, and blue subpixels share the lower plate common electrode.

9. A manufacturing method of a liquid crystal display device, comprising:
 defining areas of red, green, and blue subpixels and an area of a viewing angle control subpixel on one surface of a first substrate;
 forming gate lines in the areas of the red, green, and blue subpixels and the area of the viewing angle control subpixel which are defined on one surface of the first substrate and forming a shielding electrode within the area of the viewing angle control subpixel so as to be separated from the gate lines;
 forming a first insulation film so as to cover the gate lines formed in the areas of the red, green, and blue subpixels and the gate line and shielding electrode formed in the area of the viewing angle control subpixel;
 forming data lines crossing the gate lines in the areas of the red, green, and blue subpixels and the area of the viewing angle control subpixel, respectively;
 forming a lower transparent electrode on the first insulation film positioned on the area of the viewing angle control subpixel so as to overlap with the shielding electrode and forming a pixel electrode on the first insulation film positioned on the areas of the red, green, and blue subpixels;
 forming a second insulation film so as to cover the lower transparent electrode formed in the area of the viewing angle control subpixel and the pixel electrode formed in the areas of the red, green, and blue subpixel; and
 forming a upper transparent electrode connected to the lower transparent electrode on the second insulation film positioned on the area of the viewing angle control subpixel and forming a lower plate common electrode divided into a plurality of segments on the second insulation film positioned on the areas of the red, green, and blue subpixels,
 wherein the red, green, and blue subpixels and the viewing angle control subpixel are defined as a quad type,
 wherein the red, green, and blue subpixels operate in an FFS (Fringe Field Switching) mode, and the viewing angle control subpixel operates in an ECB (Electrically Controlled Birefringence) mode.

10. The method of claim 9, wherein one or more of the shielding electrode and the lower transparent electrode occupy at least three planes within the area of the viewing angle control subpixel and have two patterns spaced from each other and parallel to each other.

11. The method of claim 10, wherein the upper transparent electrode is formed such that the three planes of the shielding electrode and of the lower transparent electrode overlap with some regions within the area of the viewing angle control subpixel.

12. The method of claim 9, further comprising forming a second substrate to adhered to the first substrate,
 wherein the forming of a second substrate comprises:
 defining the areas of the red, green, and blue subpixels and the area of the viewing angle control subpixel on one surface of the second substrate; and
 forming a black matrix layer on one surface of the first substrate such that the areas of the red, green, and blue subpixels and the area of the viewing angle are separated from each other; and
 forming an overcoating layer so as to cover the areas of the red, green, and blue subpixels and the black matrix layer formed in the area of the viewing angel control subpixel.

13. The method of claim 12, wherein an upper plate common electrode is formed in the viewing angle control subpixel so as to cover the overcoating layer.

14. The method of claim 13, wherein the upper plate common electrode is formed so as to correspond to the upper transparent electrode within the area of the viewing angel control subpixel.

15. The method of claim 9, wherein the upper transparent electrode formed in the area of the viewing angle control subpixel is connected to the lower transparent electrode through a first contact hole formed in the second insulation film.

16. The method of claim 9, wherein the lower plate common electrode formed at a subpixel adjacent to the viewing angle control subpixel is connected to the shielding electrode through a second contact hole formed in the second insulation film, and the lower plate common electrode is shared by the red, green, and blue subpixels.

* * * * *